United States Patent
Giese

(10) Patent No.: US 10,239,128 B1
(45) Date of Patent: Mar. 26, 2019

(54) PORTABLE DRILL PRESS

(71) Applicant: Jeffry Mark Giese, Stevens Point, WI (US)

(72) Inventor: Jeffry Mark Giese, Stevens Point, WI (US)

(*) Notice: Subject to any disclaimer, the term of this patent is extended or adjusted under 35 U.S.C. 154(b) by 0 days.

(21) Appl. No.: 15/698,176

(22) Filed: Sep. 7, 2017

(51) Int. Cl.
| | |
|---|---|
| *B25H 1/00* | (2006.01) |
| *B23B 39/00* | (2006.01) |
| *B27C 3/08* | (2006.01) |
| *B25H 1/10* | (2006.01) |
| *B23B 45/00* | (2006.01) |
| *B23B 47/26* | (2006.01) |

(52) U.S. Cl.
CPC ......... *B23B 39/006* (2013.01); *B25H 1/0064* (2013.01); *B25H 1/10* (2013.01); *B27C 3/08* (2013.01); *B23B 45/00* (2013.01); *B23B 47/26* (2013.01)

(58) Field of Classification Search
CPC ....... B23B 39/006; B23B 47/26; B23B 45/00; B23B 47/287; B27C 3/08; B25H 1/0064; B25H 1/10; Y10T 408/5627; Y10T 408/5617
USPC .......................................................... 408/712
See application file for complete search history.

(56) References Cited

U.S. PATENT DOCUMENTS

| | | | | |
|---|---|---|---|---|
| 2,849,900 | A | | 9/1958 | Heidtman, Jr. |
| 2,997,900 | A | * | 8/1961 | Pugsley ............... B25H 1/0021 |
| | | | | 144/1.1 |
| 3,008,359 | A | * | 11/1961 | Mackey ................ B23B 47/287 |
| | | | | 408/115 R |
| 3,096,798 | A | * | 7/1963 | Pugsley .................. B27C 9/005 |
| | | | | 144/1.1 |
| 3,708,238 | A | * | 1/1973 | Kissane ............... B25H 1/0078 |
| | | | | 408/112 |
| 3,890,058 | A | | 6/1975 | Self et al. |
| 4,349,301 | A | | 9/1982 | Boyajian |
| 4,391,558 | A | | 7/1983 | Perry |
| 4,565,470 | A | * | 1/1986 | Karlsson ................. B25F 5/026 |
| | | | | 408/100 |
| 4,572,715 | A | | 2/1986 | Wolff |
| 5,713,702 | A | * | 2/1998 | Turner .................. B23B 41/006 |
| | | | | 408/100 |

(Continued)

*Primary Examiner* — Daniel Howell
*Assistant Examiner* — Paul M Janeski
(74) *Attorney, Agent, or Firm* — Charles S. Sara; Elizabeth L. Neal; DeWitt LLP

(57) ABSTRACT

The present invention is directed to a portable drill press apparatus for drilling a bore perfectly perpendicular to a surface. This apparatus includes a horizontal base plate having an enlarged aperture and a horizontal adjustment plate having an adjustment plate aperture. The adjustment plate is parallel to and releasably connected to the base plate by a plurality of releasable fasteners extending through a plurality of adjustment slots in the adjustment plate. A plurality of guide bolts extends vertically from the adjustment plate through a horizontal guide plate, the guide plate being parallel to the adjustment plate and slidable along the plurality of guide bolts. The guide plate has a guide plate aperture. A vertical back plate interconnects the guide plate and at least one drill clamp, the guide plate and drill clamp extending parallel to each other. The drill clamp has a variably-sized drill aperture for clamping a portable drill.

18 Claims, 14 Drawing Sheets

(56) References Cited

U.S. PATENT DOCUMENTS

| | | | |
|---|---|---|---|
| 6,655,428 B1* | 12/2003 | Kornhoff | B23Q 9/0028 |
| | | | 144/136.95 |
| 6,860,682 B1 | 3/2005 | Le Picq | |
| 7,290,574 B2* | 11/2007 | Baber | B25F 5/021 |
| | | | 144/135.2 |
| 7,708,505 B2 | 5/2010 | Opsitos et al. | |

* cited by examiner

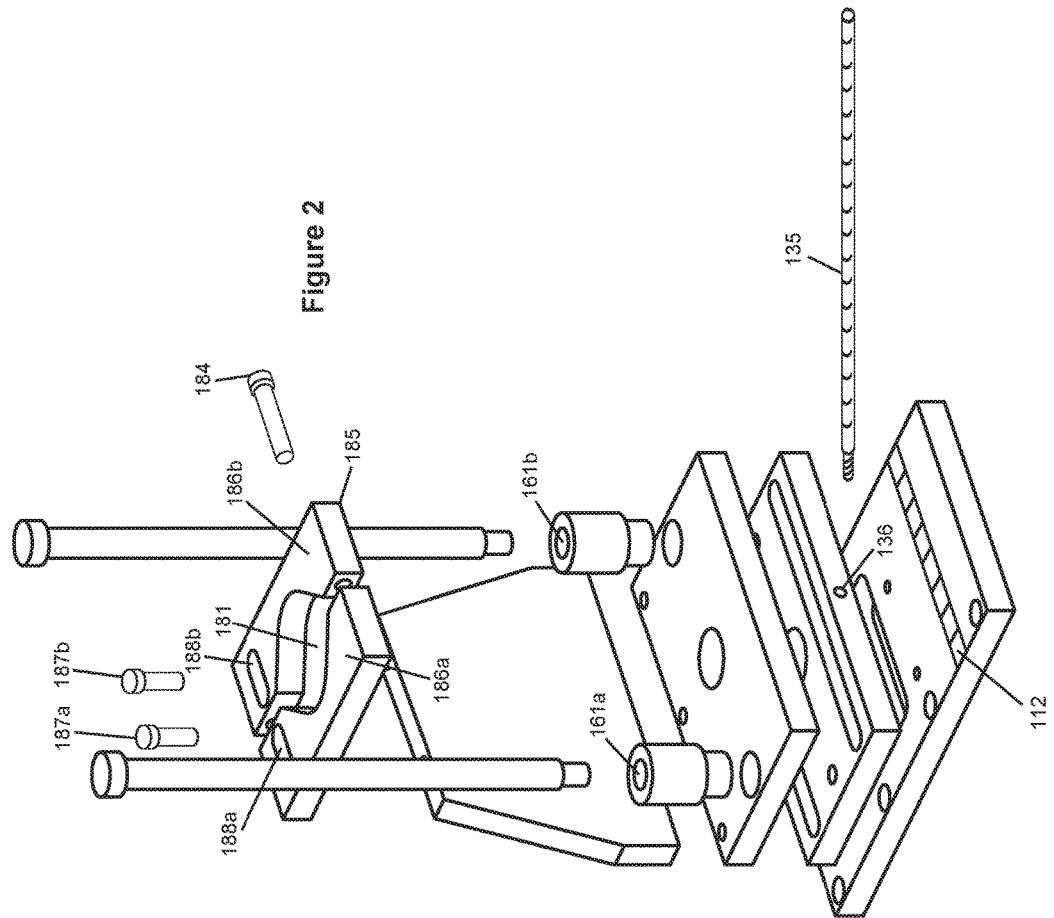

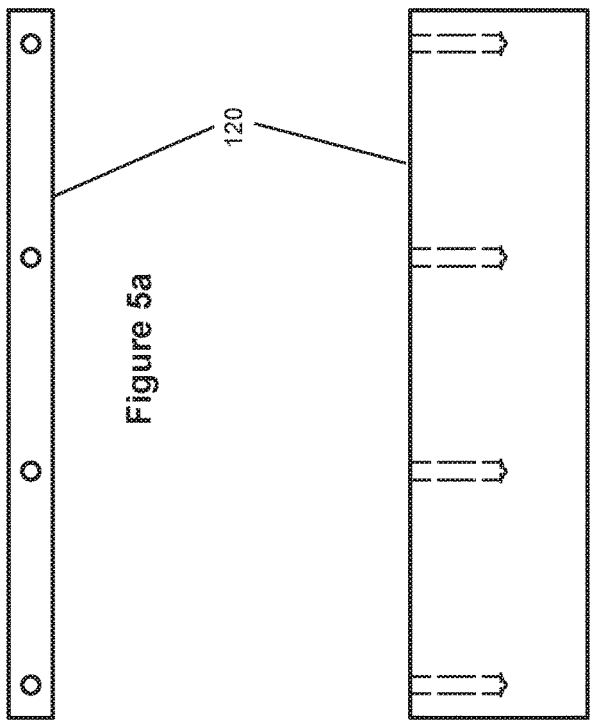
Figure 5a
Figure 5b
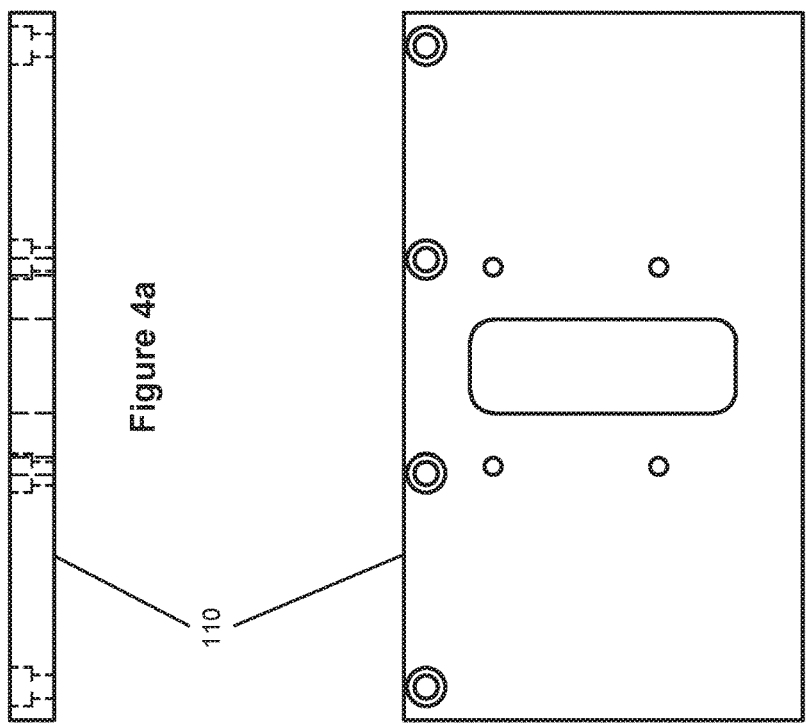
Figure 4a
Figure 4b

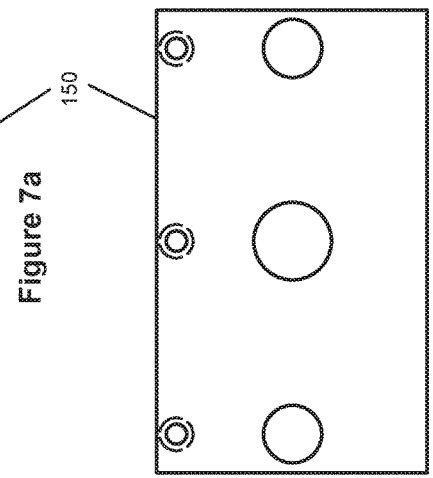
Figure 7a
Figure 7b
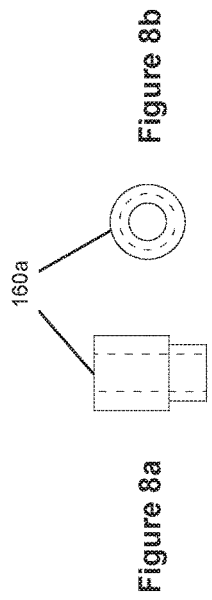
Figure 8b
Figure 8a
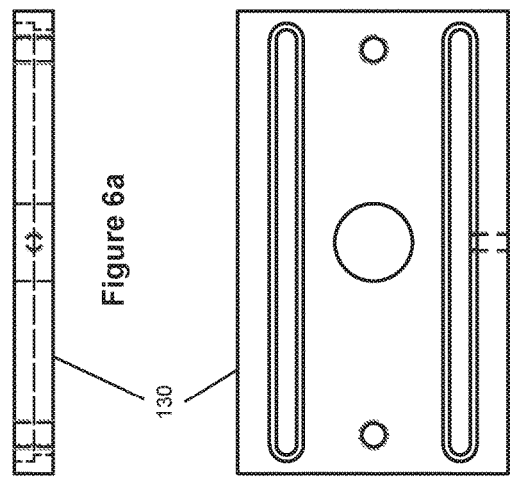
Figure 6a
Figure 6b

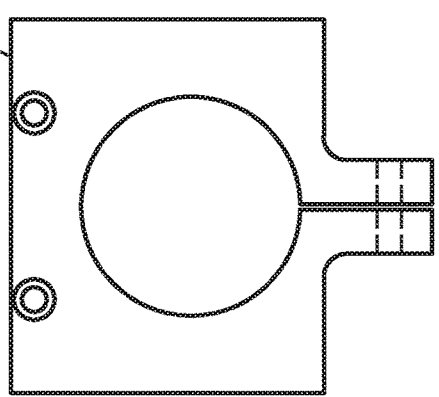
Figure 10a
Figure 10b
Figure 10c
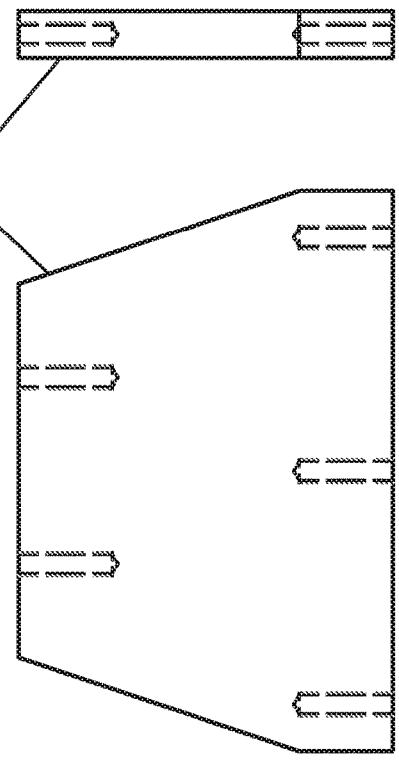
Figure 9a
Figure 9b
Figure 9c

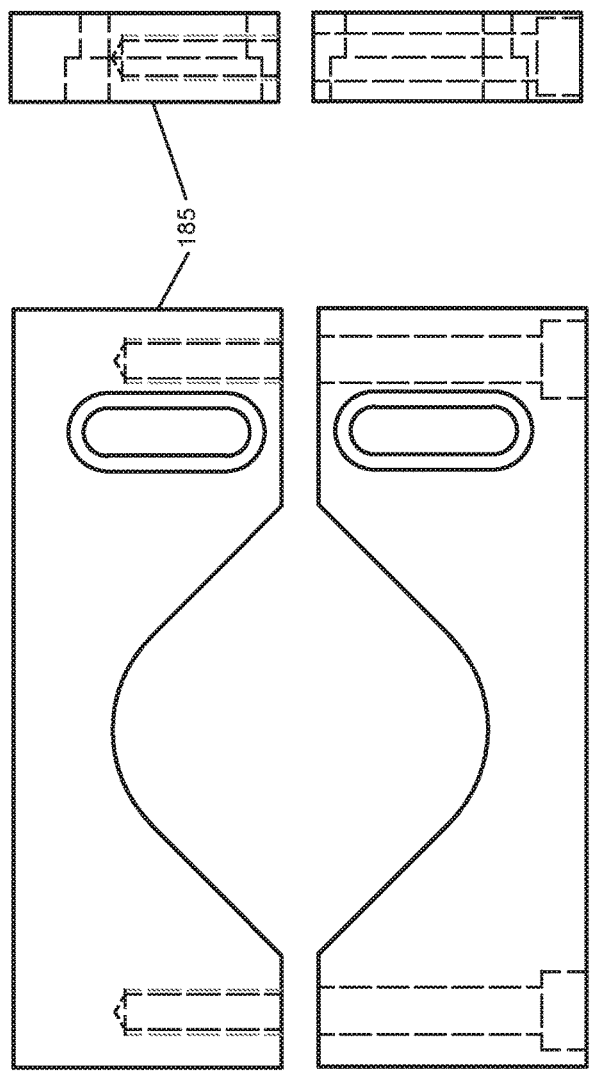
Figure 11a
Figure 11b
Figure 11c
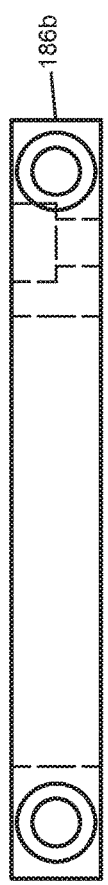
Figure 11d

PORTABLE DRILL PRESS

FIELD OF THE INVENTION

The present invention is generally directed to a tool accessory. Specifically, the present invention is directed to a portable stand or support for positioning a portable drill.

BACKGROUND OF THE INVENTION

The present invention is primarily directed to a portable tool support for workers who use portable drills in construction. Portable drills provide significant utility in the field. They allow workers to drill bores for installation of building materials and component fasteners. In some cases, the portable drill can also drive the fasteners. While some building materials may come with pre-drilled bore patterns for assembly, conditions in the field may require alterations to the bore pattern. Other materials may require drilling entirely on the fly. Portable drills also allow workers to drill in difficult-to-access areas or areas with very limited space and movement.

One drawback to using a portable drill is lack of guidance during drilling. While large drill presses can drill perfectly perpendicular, evenly distributed patterns of bores using bulky guidance mechanisms, portable drills lack such guidance mechanisms. An operator must push the portable drill into the building material and manually hold it steady while a drill bit rotates. A tired worker or one with a very powerful or otherwise difficult to control portable drill may inadvertently misalign the portable drill. Furthermore, workers with limited ability to measure drilling areas or workers with limited visual and positioning capability, such as a worker drilling in a cramped or awkward position, may also accidentally misalign the portable drill. Such misalignment can create difficulty when connecting building materials, and may cause damage to the building materials and lead to waste. An improperly angled bore may prevent fasteners from sufficiently penetrating building materials, resulting in unsafe installation and construction.

It is therefore an object of the present invention to provide a portable drill press capable of mounting to multiple different types of portable drills for drilling perpendicular bores into building materials.

SUMMARY OF THE INVENTION

The present invention is directed to a portable drill press apparatus. This apparatus includes a horizontal base plate having an enlarged aperture extending therethrough and a horizontal adjustment plate having an adjustment plate aperture extending therethrough. The adjustment plate is parallel to and releasably connected to the base plate by a plurality of releasable fasteners extending through a plurality of adjustment slots in the adjustment plate. A plurality of guide bolts extends vertically from the adjustment plate through a horizontal guide plate, the guide plate being parallel to the adjustment plate and slidable along the plurality of guide bolts. The guide plate has a guide plate aperture extending therethrough. A vertical back plate interconnects the guide plate and at least one drill clamp, the guide plate and drill clamp extending parallel to each other. The drill clamp has a variably-sized drill aperture extending therethrough.

Another embodiment of the present invention is a portable drill press system incorporating the portable drill press apparatus as above. The system also includes a portable drill having a drill bit extending through the guide plate aperture. At least part of the portable drill is located within the drill aperture The objects and advantages of the invention will appear more fully from the following detailed description of the preferred embodiment of the invention made in conjunction with the accompanying drawings and photographs.

BRIEF DESCRIPTION OF THE DRAWINGS

FIG. 2 illustrates a perspective view of an alternate embodiment of the portable drill press.

FIGS. 4a and 4b illustrate side and top views, respectively, of an exemplary embodiment of a base plate of the portable drill press.

FIGS. 5a and 5b illustrate top and side views, respectively, of an exemplary embodiment of an edge plate of the portable drill press.

FIGS. 6a and 6b illustrate front and top views, respectively, of an exemplary embodiment of an adjustment plate of the portable drill press.

FIGS. 7a and 7b illustrate front and top views, respectively, of an exemplary embodiment of a guide plate of the portable drill press.

FIGS. 8a and 8b illustrate side and top views, respectively, of an exemplary embodiment of a bolt sleeve of the portable drill press.

FIGS. 9a, 9b, and 9c illustrate top, front, and side views, respectively, of an exemplary embodiment of a back plate of the portable drill press.

FIGS. 10a, 10b, and 10c illustrate back, top, and left side views, respectively, of an exemplary embodiment of a drill clamp of the portable drill press.

FIGS. 11a and 11b illustrate top and front views, respectively, of an alternate embodiment of the drill clamp of the portable drill press.

FIGS. 11c and 11d illustrate right side views of left and right clamp arms, respectively, of an alternate embodiment of the drill clamp of the portable drill press.

Figure 1A:
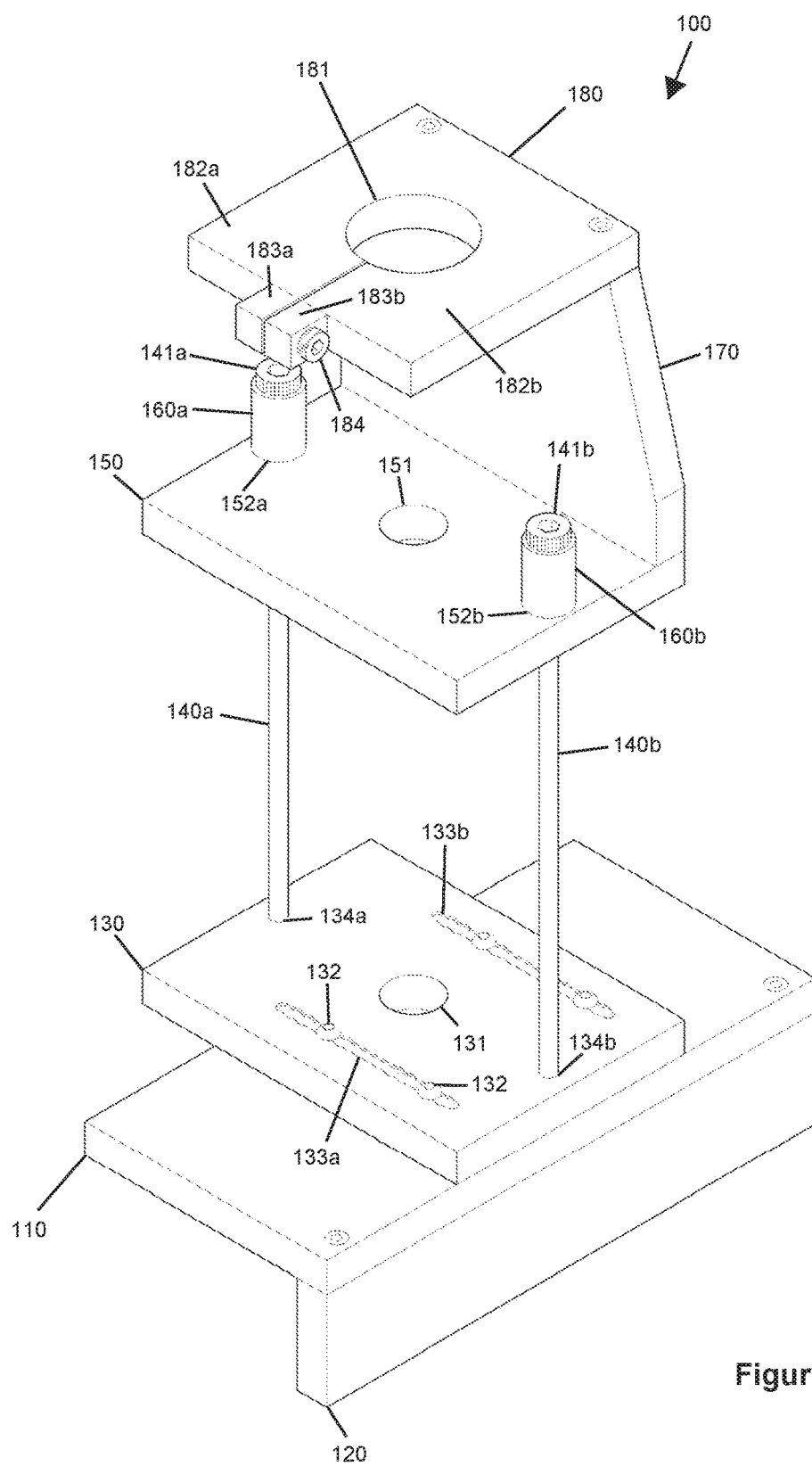
FIGS. 1a, 1b, 1c, 1d, 1e, 1f, and 1g illustrate perspective, top, bottom, front, back, right side, and left side views, respectively, of an exemplary embodiment of a portable drill press.
Figure 1B:
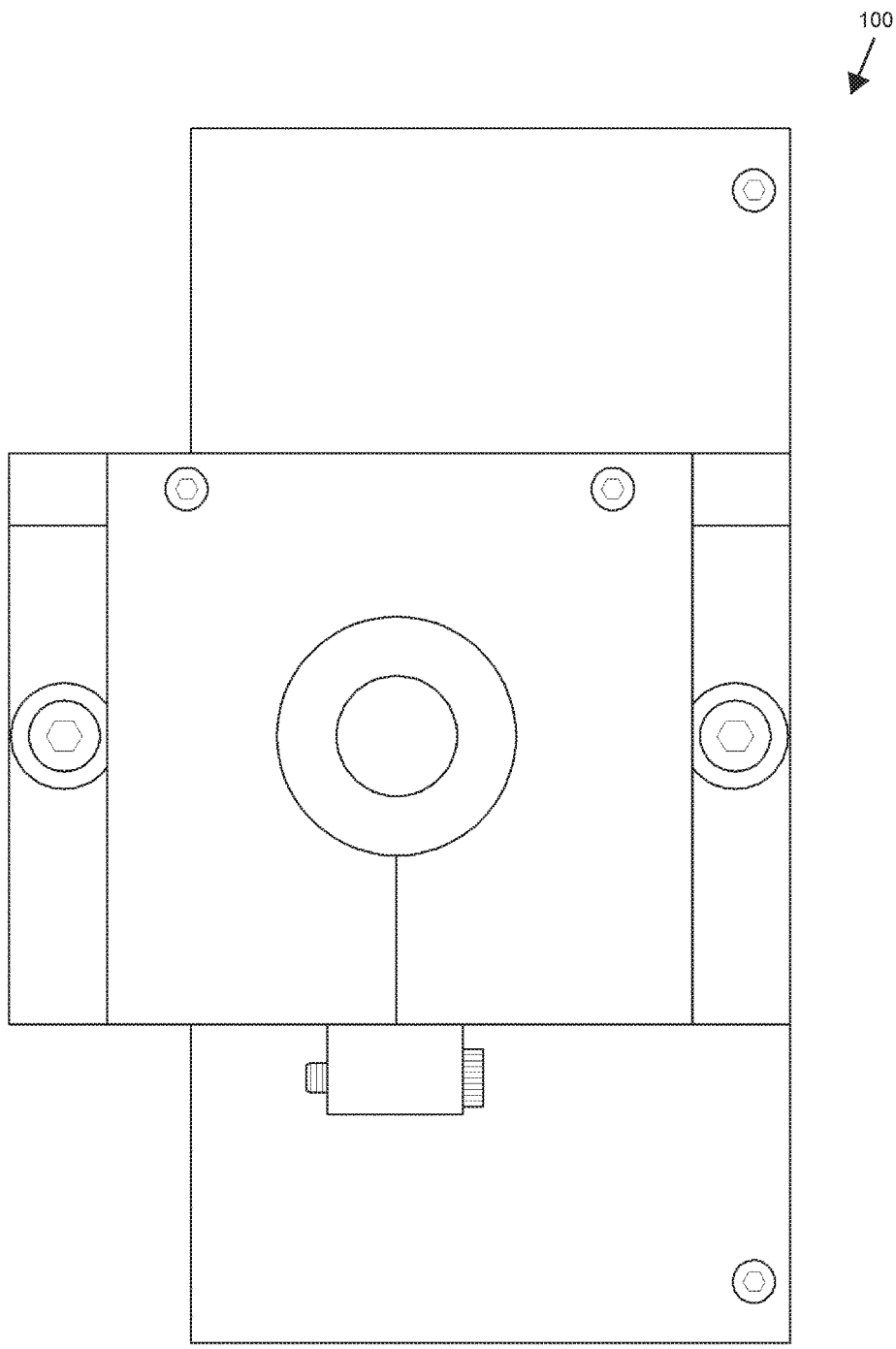
Figure 1C:
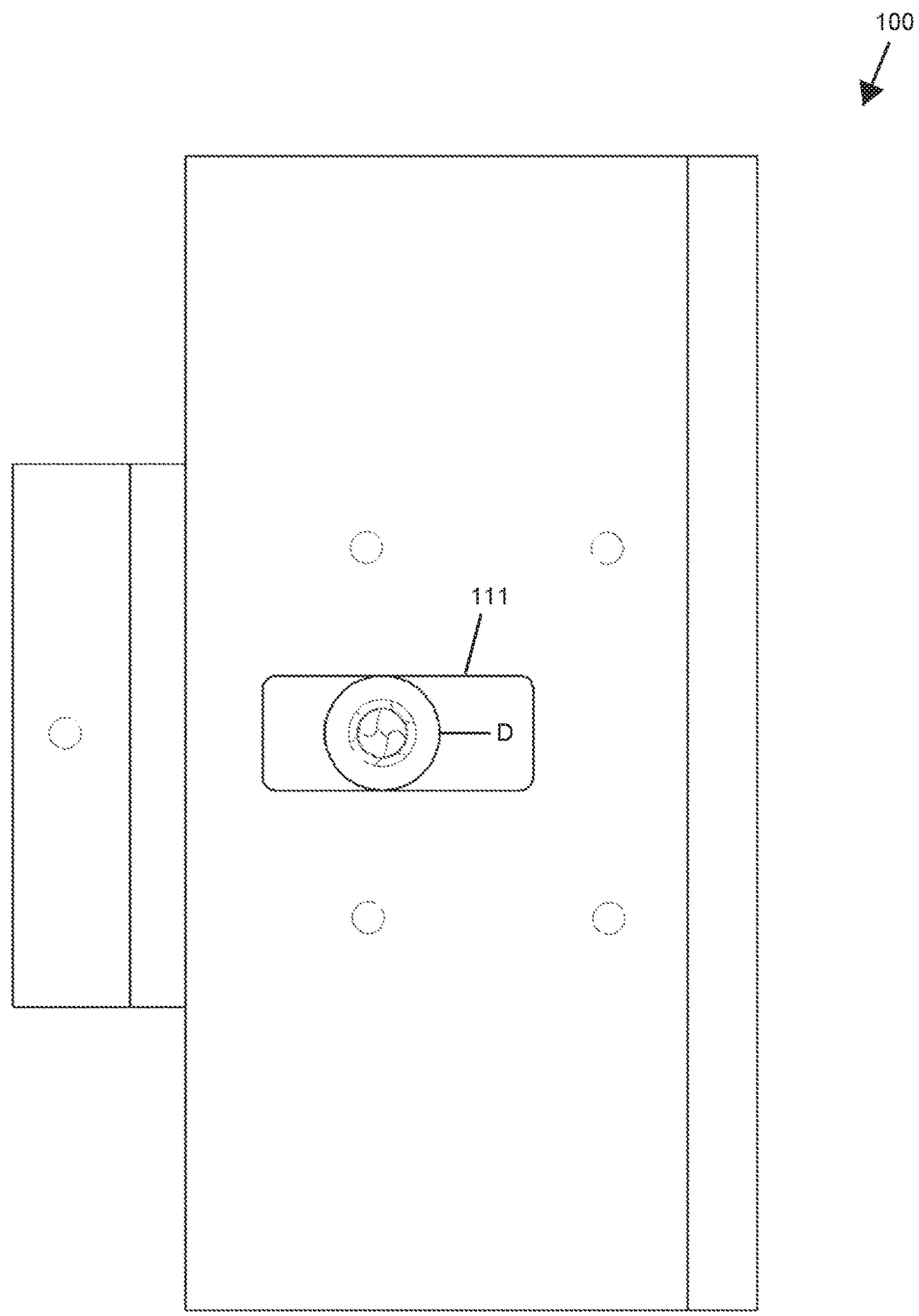
Figure 1D:
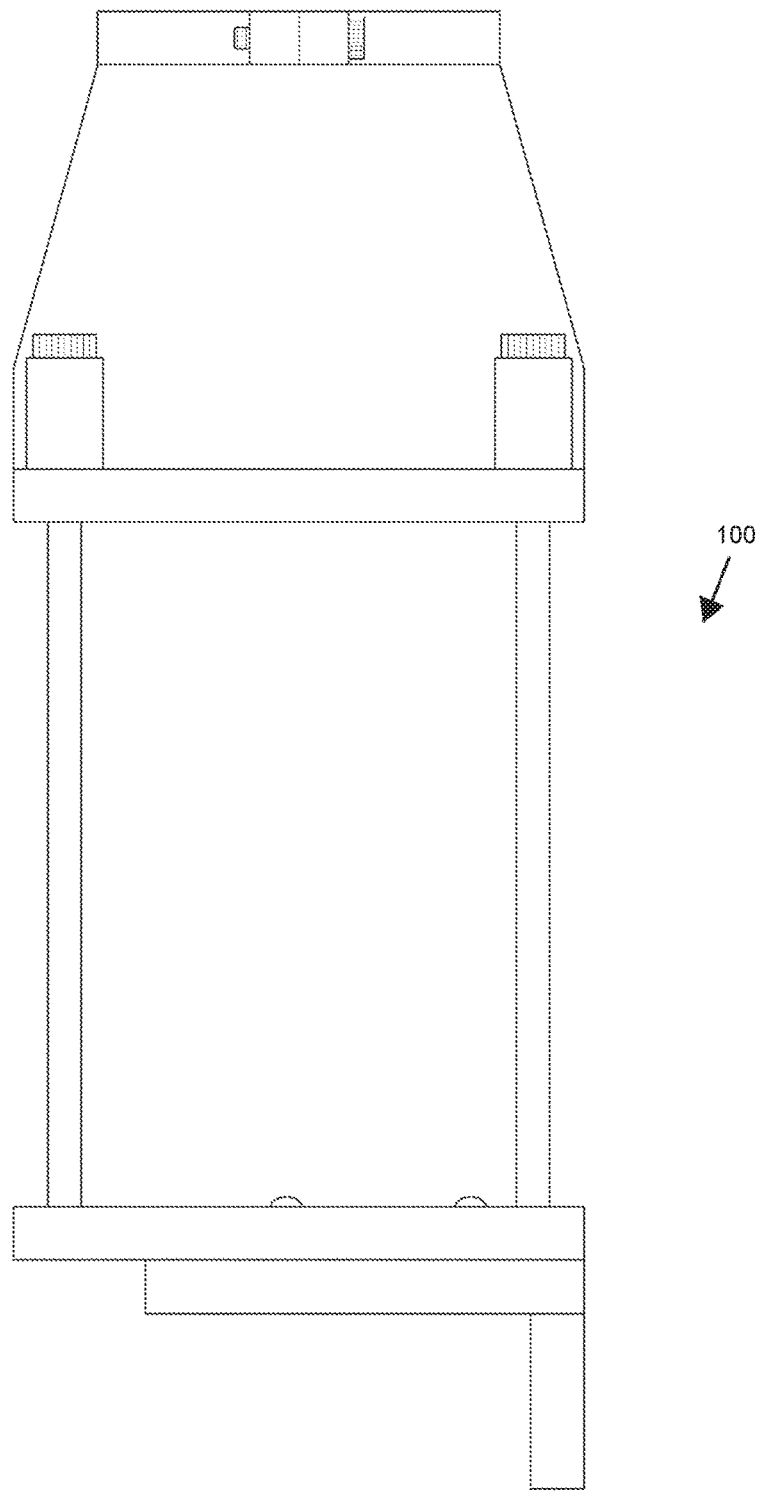
Figure 1E:
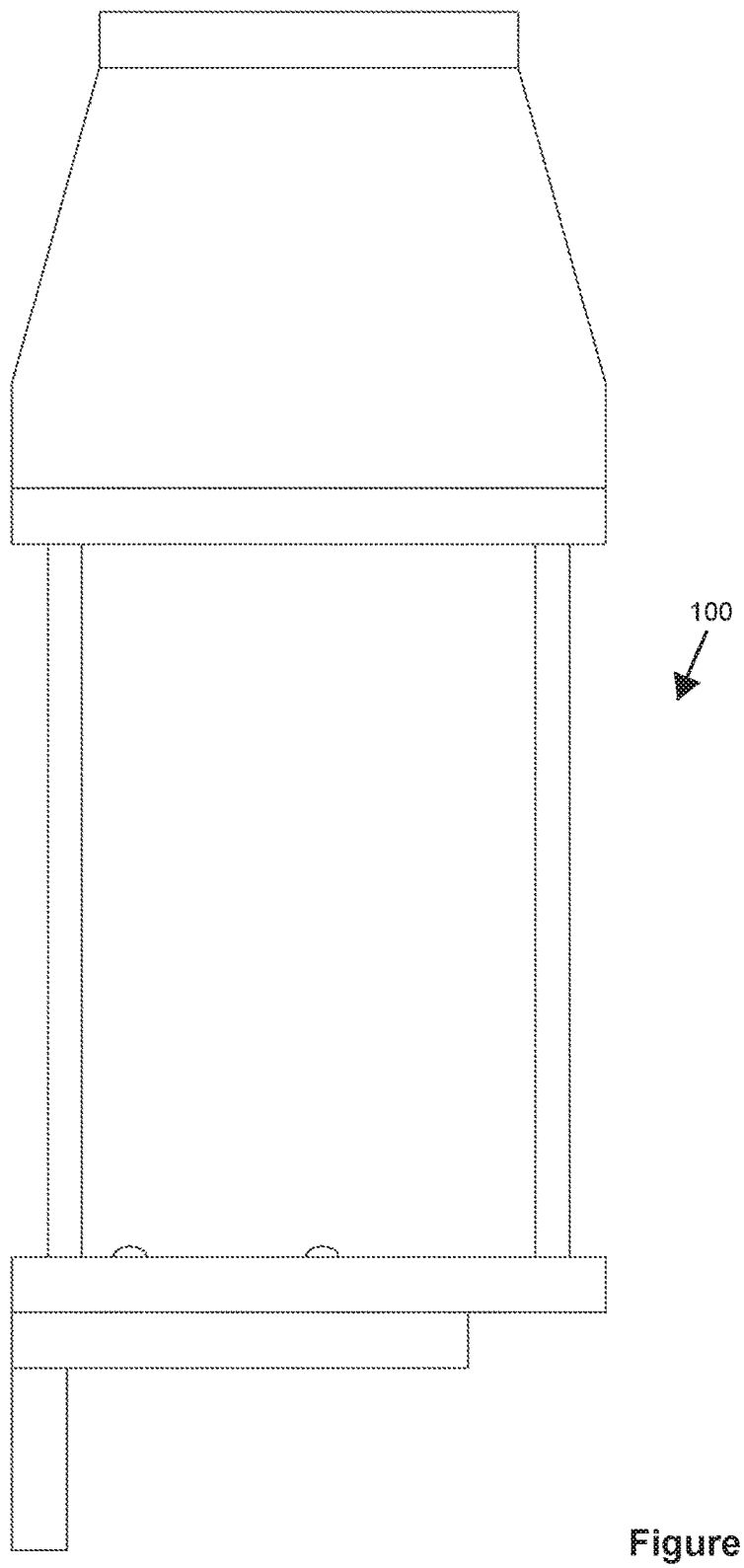
Figure 1F:
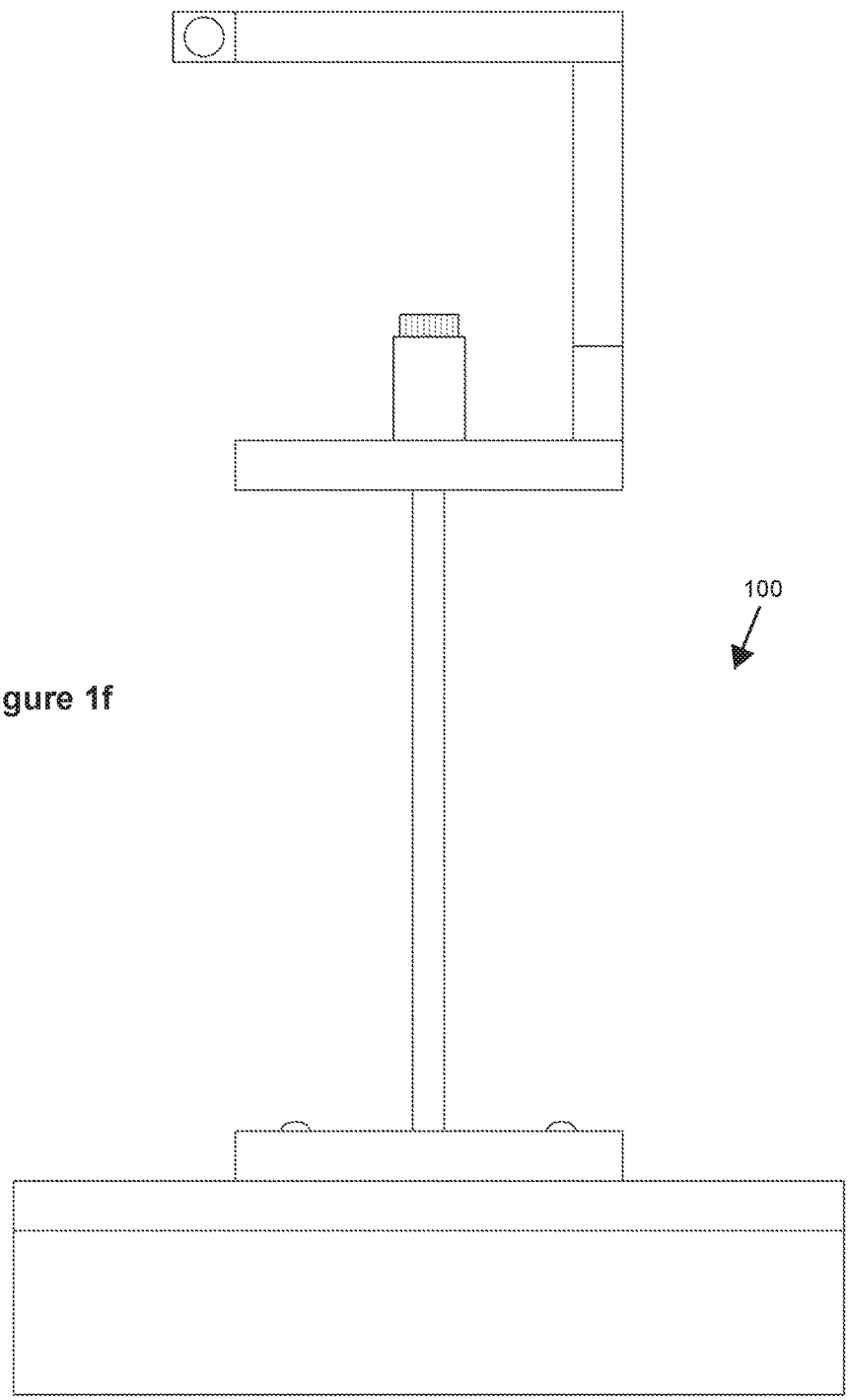
Figure 1G:
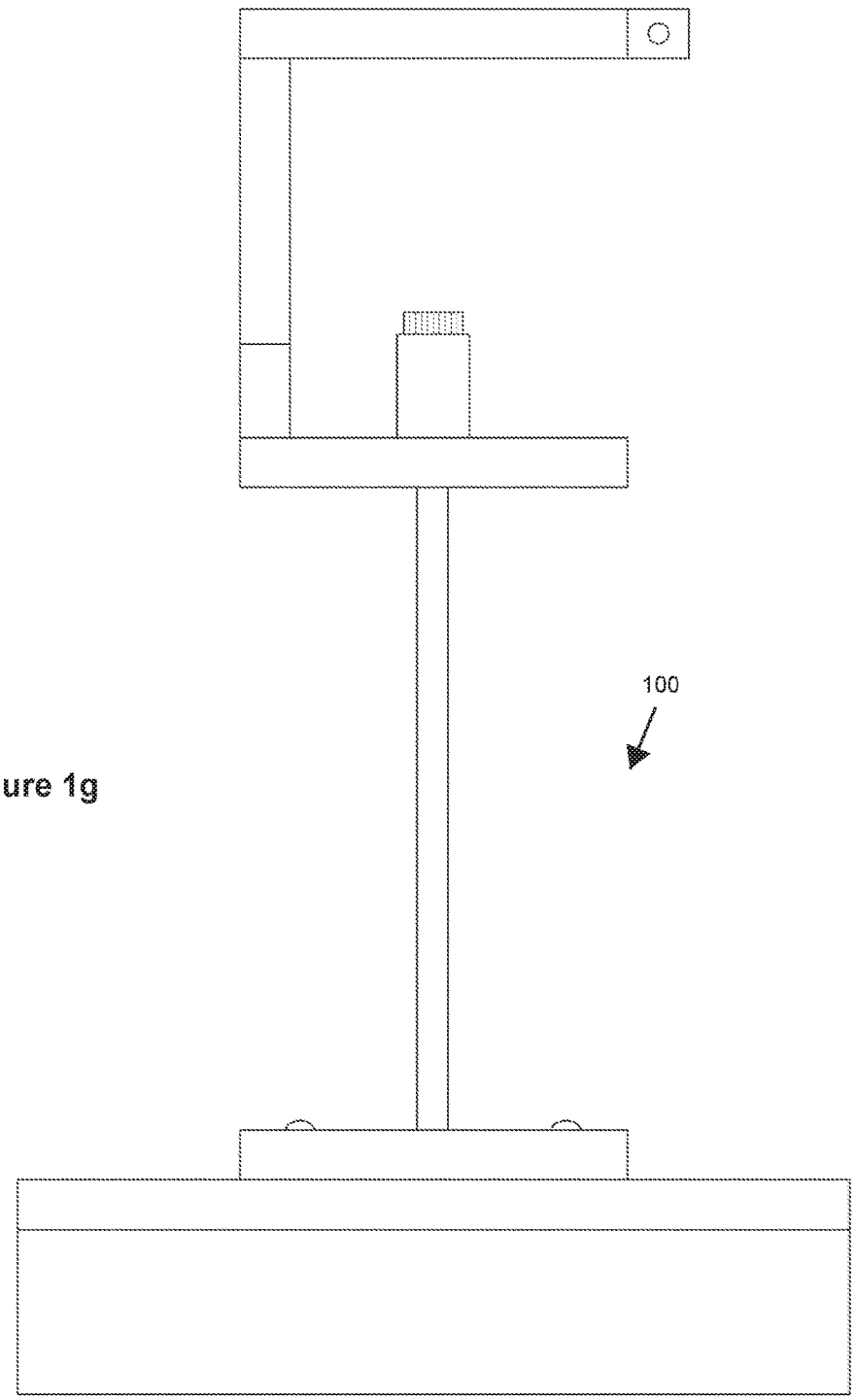

For ease of viewing, not all elements identified in one drawing are necessarily identified in every other drawing.

DETAILED DESCRIPTION OF THE INVENTION

FIGS. 1a through 1g illustrate perspective, top, bottom, front, back, right side, and left side views, respectively, of an exemplary embodiment of portable drill press 100. Referring now to the drawings, the present invention is directed to portable drill press 100 for a portable drill terminating in a drill bit D (shown in FIG. 1c). Portable drill press 100 includes a base plate 110 removably connected to an optional edge plate 120. Base plate 110 is parallel to and moveably connected to an adjustment plate 130. Guide bolts 140a and 140b extending vertically from adjustment plate 130 slidably connect to a guide plate 150 through bolt sleeves 160a and 160b, respectively. A back plate 170 connects guide plate 150 parallel to a drill clamp 180 or an alternate drill clamp 185 (described in further detail in relation to FIG. 2 below). As used in this application, the term "plate" refers to a substantially flat, planar piece of material.

Base plate 110 is a horizontal, rectangular metal plate with an enlarged aperture 111 extending therethrough. During drilling, at least part of the drill bit passes through enlarged aperture 111, which lies directly above the surface receiving the bore, and extends into the surface. Due to at least one dimension of enlarged aperture 111 that is larger as compared to other apertures located above enlarged aperture 111, the drill bit may be moved back and forth to accommodate drilling at various locations, as will be shown below. In the exemplary embodiment, enlarged aperture 111 is an oblong aperture with an extended width. In other embodiments, enlarged aperture 111 may be a circular aperture with an enlarged radius.

Optional edge plate 120 is a vertical, rectangular metal plate. Edge plate 120 may be permanently or removably connected to a left, bottom left, right, or bottom right side of base plate 110. In the exemplary embodiment, edge plate 120 is connected to and extends downwardly from the bottom right side of base plate 110. Edge plate 120 allows an operator to precisely drill a straight line of bores, all at the same distance from an edge in contact with an inner or outer vertical surface of edge plate 120. Edge plate 120 also allows the operator to drill rounded surfaces, such as round stock or a convex surface, by providing a second plane (in combination with base plate 110) to hold portable drill press 100 in place on the rounded surface. In certain embodiments, the operator may remove edge plate 120 in the event that the operator is drilling on a large flat surface, such as a floor or wall, and use other means to ensure a straight line of bores.

Adjustment plate 130 is a horizontal, rectangular metal plate with an adjustment plate aperture 131 extending therethrough. During drilling, the drill bit passes through adjustment plate aperture 131. Releasable fasteners 132 extending through adjustment slots 133a and 133b to base plate 110 affix adjustment plate 130 atop base plate 110 at a variety of positions. In the exemplary embodiment of FIG. 1a, adjustment slots 133a and 133b expand and contract at discrete intervals along their length. When contracted, adjustment slots 133a and 133b are narrower than releasable fasteners 132 to allow adjustment only in such intervals. In other embodiments, adjustment slots 133a and 133b are unvarying in width to allow adjustment at any interval desired (see FIG. 2). In certain other embodiments, either adjustment slot 133a or adjustment slot 133b may have unvarying width, while the other is of the varying width type.

If desired, the operator may remove releasable fasteners 132 to rotate adjustment plate 130 through 180 degrees and adopt an opposite orientation with respect to base plate 110. This allows edge plate 120 to be positioned on the right or left side relative to drill clamp 180, eliminating limitations on guidance provided by edge plate 120 and/or the handedness of a person using portable drill press 100.

Adjustment plate 130 also includes threaded bolt apertures 134a and 134b which removably receive the threaded ends of guide bolts 140a and 140b. Guide bolts 140a and 140b slidably connect to guide plate 150 through bolt sleeves 160a and 160b, respectively. Guide bolts 140a and 140b extend through sleeve channels 161a and 161b, respectively. Bolt stops 141a and 141b are located at the upper ends of guide bolts 140a and 140b. Bolt stops 141a and 141b are wider than sleeve channels 161a and 161b to prevent the assembly of guide plate 150, back plate 170, and drill clamp 180 from falling off of guide bolts 140a and 140b. Guide bolts 140a and 140b are removable, allowing replacement with longer or shorter guide bolts 140a and 140b to accommodate different lengths of drill bits and bores.

Guide plate 150 is a horizontal, rectangular metal plate with a guide plate aperture 151 extending therethrough. During drilling, the drill bit extends through guide plate aperture 151. Sleeve receivers 152a and 152b receive the lower ends of bolt sleeves 160a and 160b in a friction fit.

Back plate 170 is a vertical metal plate. In the exemplary embodiment, the upper end of back plate 170 has a length that matches the length of drill clamp 180, while the lower end of back plate 170 has a length that matches the length of guide plate 150. This fully supports both guide plate 150 and drill clamp 180, while reducing the overall weight and bulk of portable drill press 100. In the exemplary embodiment, back plate 170 has a half-octagonal configuration of a combined trapezoid and rectangle, with the shorter length being connected to drill clamp 180 and the longer length being connected to guide plate 150, though other configurations are possible and contemplated.

Drill clamp 180 is a horizontal, rectangular metal plate with a variably-sized drill aperture 181 extending therethrough. During drilling, at least part of the portable drill is held securely within drill aperture 181. Drill clamp 180 has a length smaller than a length of guide plate 150 to accommodate motion up and down guide bolts 140a and 140b. Drill clamp 180 is partially split to form clamp flanges 182a and 182b. Clamp flanges 182a and 182b may move apart and come together through rotation of a clamp bolt 184 extending through clamp tabs 183a and 183b. This has the effect of expanding and contracting drill aperture 181 to allow the insertion, clamping, and removal of the portable drill. Because different portable drills may have different sizes and configurations, drill clamp 180 is removable from back plate 170. Drill clamp 180 may be replaced with another drill clamp 180 with a differently sized or configured drill aperture 181, or with alternate drill clamp 185.

FIG. 2 illustrates a perspective view of an alternate embodiment of portable drill press 100 featuring optional measuring indicia 112 and an optional interval rod 135. FIG. 2 also shows portable drill press 100 with edge plate 120 removed, and with alternate drill clamp 185 replacing drill clamp 180.

In certain embodiments, a surface of base plate 110 includes a plurality of measuring indicia 112. Measuring indicia 112 may be incised in or printed on the upper or side surface of base plate 110, or may be formed on an attached member, such as, but not limited to, a printed polymer tape. Measuring indicia 112 allow the operator to, by way of non-limiting example, precisely determine the distance of a first bore from a floor edge, allowing the operator to set up portable drill press 100 to drill a series of bores in line with the first bore. In certain embodiments, measuring indicia 112 may be placed on multiple locations on base plate 110.

Interval rod 135 allows the operator to space drilled bores a predetermined distance apart. Interval rod 135 has a threaded end removably located within a threaded interval rod aperture 136 on at least one side of adjustment plate 130. In the exemplary embodiment, interval rod 135 is marked with length indicia allowing the operator to measure the appropriate distance between bores. In another embodiment, interval rod 135 terminates at the predetermined distance between bores, allowing the operator to visually align interval rod 135 with the last-drilled bore. This embodiment may use multiple interchangeable interval rods 135 having different sizes to drill different lines of bores with different spacings between bores. In yet another embodiment, interval rod 135 has an L-shaped configuration with a horizontal and a vertical leg, allowing the vertical leg to be dropped in the last-drilled bore. This embodiment may also use multiple interchangeable interval rods 135 with different sizes of the horizontal leg to drill different spacings between bores.

Alternate drill clamp 185 features a drill aperture 181 formed by two separate clamp arms 186a and 186b having concave inner surfaces. During drilling, the portable drill is held securely within drill aperture 181 between clamp arms 186a and 186b. Each of clamp arms 186a and 186b connects directly to back plate 170 using clamp fasteners 187a and 187b, respectively, extending through clamp slots 188a and 188b, again respectively. Clamp slots 188a and 188b allow precise incremental adjustment of the position of clamp arms 186a and 186b to accommodate a wide variety of portable drill sizes and configurations. In this embodiment, clamp bolt 184 extends directly through clamp arms 186a and 186b to provide additional clamping force on the portable drill. Alternate drill clamp 185 can be used as a replacement for drill clamp 180, or used of its own accord in portable drill press 100 if, by way of non-limiting example, an operator anticipated fitting a wide variety of drills to portable drill press 100. In certain embodiments, portable drill press 100 includes multiple interchangeable drill clamps 180 and/or alternate drill clamps 185. Each of the interchangeable drill clamps 180 and/or alternate drill clamps 185 has a different dimension or different configuration from another to ensure a wide variety of drills.

Figure 3C:
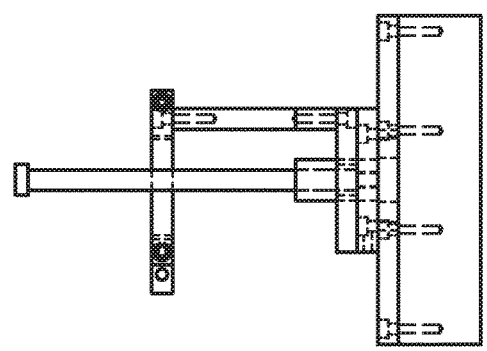
FIGS. 3a 3b, and 3c illustrate top, front, and right side views, respectively, of the exemplary embodiment of a portable drill press.
Figure 3A:
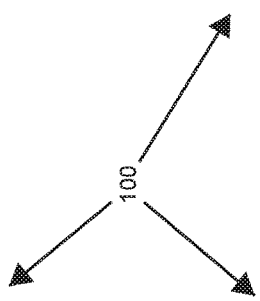
Figure 3B:
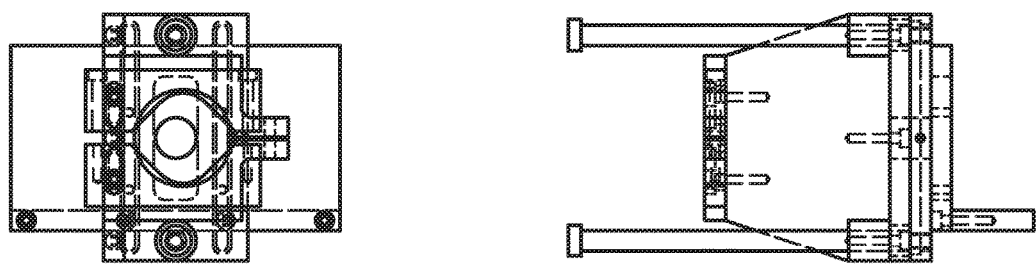

FIGS. 3a through 3c illustrate additional top, front, and right side views, respectively, of the exemplary embodiment of portable drill press 100 as shown in FIG. 1. FIGS. 4a through 11d illustrate multiple view of various components of portable drill press 100. FIGS. 4a and 4b illustrate side and top views, respectively, of base plate 110. FIGS. 5a and 5b illustrate top and side views, respectively, of edge plate 120. FIGS. 6a and 6b illustrate front and top views, respectively, of adjustment plate 130. FIGS. 7a and 7b illustrate front and top views, respectively, of guide plate 150. FIGS. 8a and 8b illustrate side and top views, respectively, of bolt sleeve 160a. FIGS. 9a, 9b, and 9c illustrate top, front, and side views, respectively, of back plate 170. FIGS. 10a, 10b, and 10c illustrate back, top, and left side views, respectively, of drill clamp 180. FIGS. 11a and 11b illustrate top and front views, respectively, of alternate drill clamp 185. FIGS. 11c and 11d illustrate right side views of left and right clamp arms 186a and 186b, respectively.

Figure 12:
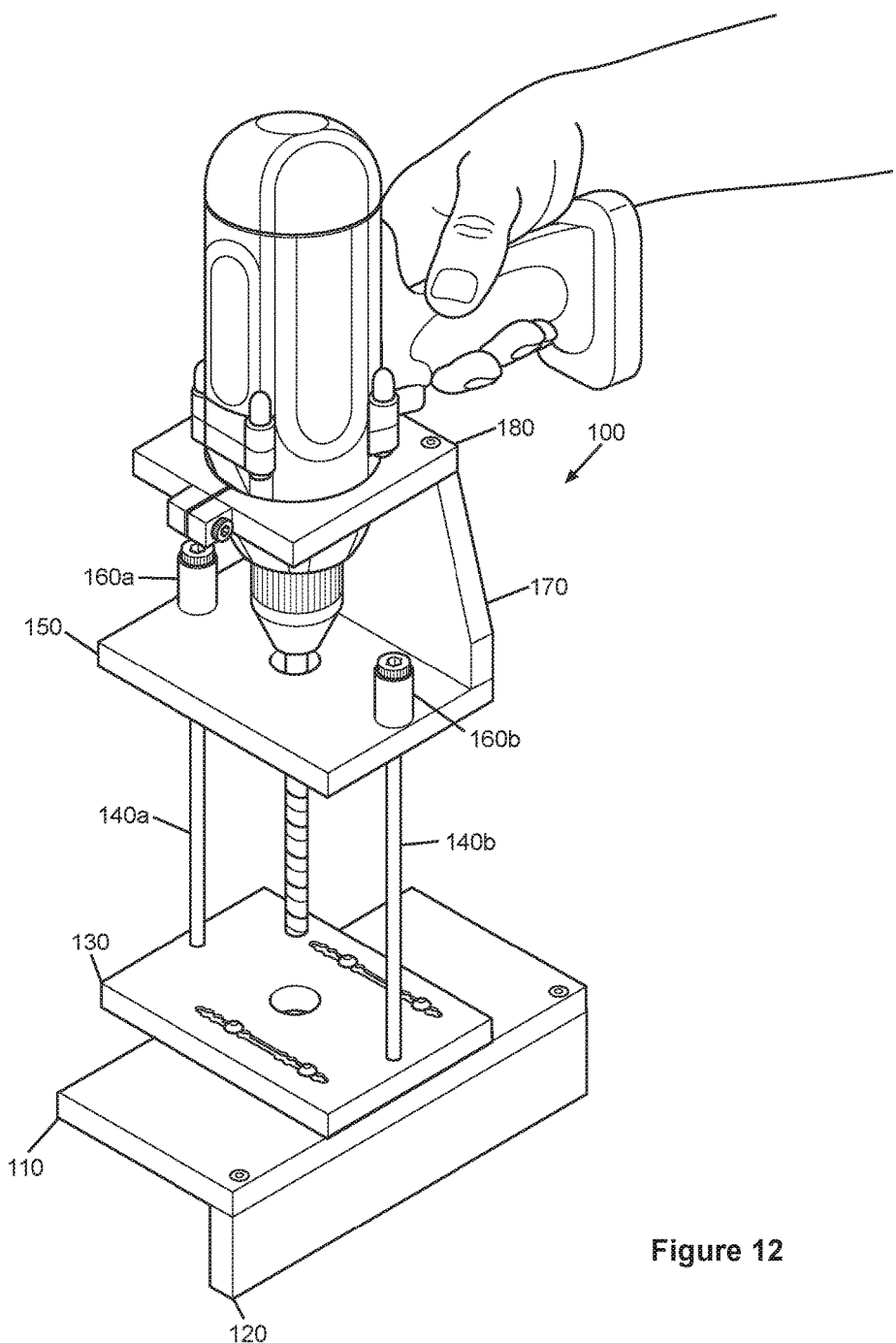
FIG. 12 illustrates a perspective view of the exemplary embodiment of a portable drill press as used with a portable drill.

FIG. 12 illustrates a perspective view of the exemplary embodiment of a portable drill press as used with a portable drill. In use, the operator places base plate 110 of portable drill press 100 on the surface to be drilled. If used, edge plate 120 is aligned with a side or curved surface. The operator inserts the drill bit and part of the portable drill through drill aperture 181 until the drill bit reaches a proper drilling depth, then tightens drill clamp 181 or alternate drill clamp 185 to hold the portable drill in place. Next, the operator releases releasable fasteners 132, moves adjustment plate 130 laterally across base plate 110 until adjustment plate aperture 131 is centered on the location to be drilled, and fastens down releasable fasteners 132. Lateral movement of adjustment plate 130 may be guided by measuring indicia 120 or some other measurement means.

The operator may then drill a hole by activating the portable drill and moving guide plate 150 down guide bolts 140 until guide plate 150 contacts bolt sleeves 160a and 160b. The operator can then lift the portable drill up until it disengages from the surface. For a series of bores, the operator moves portable drill press 100 a specific length along the surface and repeats the process. Movement along the surface may be guided by interval rod 135 or some other measurement means.

Any version of any component or method step of the invention may be used with any other component or method step of the invention. The elements described herein can be used in any combination whether explicitly described or not. All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within the range, whether specifically disclosed or not. Further, these numerical ranges should be construed as providing support for a claim directed to any number of subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated reference, the patent disclosure controls.

The devices, methods, compounds and composition of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A portable drill press apparatus, comprising:
    a horizontal base plate having an enlarged aperture extending therethrough;
    a horizontal adjustment plate having an adjustment plate aperture extending therethrough, the adjustment plate parallel to and releasably connected to the base plate by a plurality of releasable fasteners extending through a plurality of adjustment slots in the adjustment plate, wherein at least one of the plurality of adjustment slots expands and contracts at discrete intervals along its length, such that when contracted the width of at least one of the plurality of adjustment slots is narrower than the width of the plurality of releasable fasteners;
    a plurality of guide bolts extending vertically from the adjustment plate through a horizontal guide plate, the guide plate having a guide plate aperture extending therethrough, the guide plate being parallel to the adjustment plate and slidable along the plurality of guide bolts;

a vertical back plate interconnecting the guide plate and at least one drill clamp, the guide plate and drill clamp extending parallel to each other, the drill clamp having a variably-sized drill aperture extending therethrough.

2. The apparatus of claim 1, further comprising a vertical edge plate extending downwardly from one side of the base plate.

3. The apparatus of claim 2, wherein the edge plate is removable from the base plate.

4. The apparatus of claim 1, wherein at least one of the plurality of adjustment slots does not vary in width along its length.

5. The apparatus of claim 1, wherein the plurality of guide bolts are removable and replaceable with another plurality of guide bolts.

6. The apparatus of claim 1, wherein each of the plurality of guide bolts extends through a sleeve channel in a bolt sleeve connected to the guide plate.

7. The apparatus of claim 6, wherein each of the plurality of guide bolts has a bolt stop on its upper end, the bolt stop having a width greater than the width of the sleeve channel.

8. The apparatus of claim 1, wherein the drill clamp has a length smaller than a length of the guide plate.

9. The apparatus of claim 1, wherein the at least one drill clamp comprises a plurality of interchangeable drill clamps, each of the plurality of interchangeable drill clamps having a different dimension or different configuration from another of the plurality of interchangeable drill clamps.

10. The apparatus of claim 1, further comprising a plurality of measuring indicia on a surface of the base plate.

11. The apparatus of claim 1, further comprising an interval rod removably extending from an interval rod aperture on a horizontal surface of the adjustment plate.

12. A portable drill press apparatus, comprising:
a horizontal base plate having an enlarged aperture extending therethrough;
a horizontal adjustment plate having an adjustment plate aperture extending therethrough, the adjustment plate parallel to and releasably connected to the base plate by a plurality of releasable fasteners extending through a plurality of adjustment slots in the adjustment plate;
a plurality of guide bolts extending vertically from the adjustment plate through a horizontal guide plate, the guide plate having a guide plate aperture extending therethrough, the guide plate being parallel to the adjustment plate and slidable along the plurality of guide bolts;
a vertical back plate interconnecting the guide plate and at least one drill clamp, the guide plate and drill clamp extending parallel to each other, the drill clamp having a variably-sized drill aperture extending therethrough, wherein the back plate has a half-octagonal configuration, with the shorter length being connected to the drill clamp and the longer length being connected to the guide plate.

13. The apparatus of claim 1, wherein the drill clamp is a partially split plate forming a pair of clamp flanges extending around the drill aperture, each of the pair of clamp flanges having a clamp tab extending therefrom.

14. The apparatus of claim 13, wherein the pair of clamp flanges are interconnected by a clamp bolt extending therethrough.

15. A portable drill press apparatus, comprising:
a horizontal base plate having an enlarged aperture extending therethrough;
a horizontal adjustment plate having an adjustment plate aperture extending therethrough, the adjustment plate parallel to and releasably connected to the base plate by a plurality of releasable fasteners extending through a plurality of adjustment slots in the adjustment plate;
a plurality of guide bolts extending vertically from the adjustment plate through a horizontal guide plate, the guide plate having a guide plate aperture extending therethrough, the guide plate being parallel to the adjustment plate and slidable along the plurality of guide bolts;
a vertical back plate interconnecting the guide plate and at least one drill clamp, the guide plate and drill clamp extending parallel to each other, the drill clamp having a variably-sized drill aperture extending therethrough, wherein the drill clamp is a pair of clamp arms, each of the pair of clamp arms having a concave inner surface forming one half of the drill aperture, each of the clamp arms connecting directly to the back plate through a removable clamp fastener extending through a clamp slot extending through the clamp arm.

16. The apparatus of claim 15, wherein the pair of clamp arms are interconnected by a clamp bolt extending therethrough.

17. A portable drill press apparatus, comprising:
a horizontal base plate having an enlarged aperture extending therethrough,
a horizontal adjustment plate having an adjustment plate aperture extending therethrough, the adjustment plate parallel to and releasably connected to the base plate by a plurality of releasable fasteners extending through a plurality of adjustment slots in the adjustment plate,
a plurality of guide bolts extending vertically from the adjustment plate through a horizontal guide plate, the guide plate having a guide plate aperture extending therethrough, the guide plate being parallel to the adjustment plate and slidable along the plurality of guide bolts,
a vertical back plate interconnecting the guide plate and at least one drill clamp, the guide plate and drill clamp extending parallel to each other, the drill clamp having a variably-sized drill aperture extending therethrough; and
a portable drill having a drill bit extending through the guide plate aperture, at least part of the portable drill being located within the variably-sized drill aperture, wherein the portable drill is clamped within the variably-sized drill aperture by a clamp bolt extending through a pair of clamp arms and by a plurality of clamp fasteners extending though a pair of clamp slots in the pair of clamp arms.

18. The portable drill press apparatus of claim 17, wherein the portable drill is clamped within the variably-sized drill aperture by a clamp bolt extending through a pair of clamp tabs extending from a plurality of clamp flanges.

* * * * *